United States Patent
Reynders, III

(10) Patent No.: US 11,485,014 B1
(45) Date of Patent: Nov. 1, 2022

(54) LEARNING AGENT CATEGORIES USING AGENT TRAJECTORY CLUSTERING

(71) Applicant: Latent Strategies LLC, Newton, MA (US)

(72) Inventor: John Van Wicheren Reynders, III, Newton, MA (US)

(73) Assignee: Latent Strategies LLC, Newton, MA (US)

( * ) Notice: Subject to any disclaimer, the term of this patent is extended or adjusted under 35 U.S.C. 154(b) by 0 days.

(21) Appl. No.: 17/520,109

(22) Filed: Nov. 5, 2021

(51) Int. Cl.
    *B25J 9/16* (2006.01)
    *G06K 9/62* (2022.01)

(52) U.S. Cl.
    CPC .............. *B25J 9/1664* (2013.01); *B25J 9/163* (2013.01); *B25J 9/1661* (2013.01); *G06K 9/628* (2013.01); *G06K 9/6223* (2013.01)

(58) Field of Classification Search
    CPC ........ B25J 9/1664; B25J 9/163; B25J 9/1661; G06K 9/6223; G06K 9/628
    See application file for complete search history.

(56) References Cited

U.S. PATENT DOCUMENTS

2022/0001892 A1* 1/2022 Fairley .................. G06N 20/00

OTHER PUBLICATIONS

Golovin et al., "Google Vizier: A Service for Black-Box Optimization," Proceedings of the 23rd ACM SIGKDD International Conference on Knowledge Discovery and Data Mining, Aug. 13-17, 2017, 10 pages.

* cited by examiner

*Primary Examiner* — Basil T. Jos
(74) *Attorney, Agent, or Firm* — Fish & Richardson P.C.

(57) ABSTRACT

Methods, systems, and apparatus, including computer programs encoded on a computer storage medium for selecting actions for an agent in an environment. In one aspect, a system comprises receiving an agent trajectory that characterizes interaction of an agent with an environment to perform one or more initial tasks in the environment; processing the agent trajectory to generate a classification output that comprises a respective classification score for each agent category in a set of possible agent categories, wherein each possible agent category is associated with a respective task selection policy; classifying the agent as being included in a corresponding agent category based on the classification scores; selecting tasks to be performed by the agent in the environment based on the task selection policy of the corresponding agent category; and transmitting, to the agent, data defining the selected tasks to be performed by the agent in the environment.

18 Claims, 6 Drawing Sheets

LEARNING AGENT CATEGORIES USING AGENT TRAJECTORY CLUSTERING

BACKGROUND

This specification relates to selecting tasks for an agent to perform in an environment.

An environment can be, e.g., a real-world environment or a simulated environment, and an agent can accomplish tasks in an environment, e.g., by performing actions to interact with the environment. A task defines a goal-oriented objective to be achieved by an agent as a result of interacting with an environment.

SUMMARY

This specification describes a task selection system implemented as computer programs on one or more computers in one or more locations. The task selection system can classify an agent as being included in an agent category, and then select tasks for the agent using a task selection policy associated with the agent category.

According to a first aspect, there is provided a method performed by one or more computers, the method comprising: receiving an agent trajectory that characterizes interaction of an agent with an environment to perform one or more initial tasks in the environment; processing the agent trajectory using an agent classification model to generate a classification output that comprises a respective classification score for each agent category in a set of possible agent categories, wherein each possible agent category is associated with a respective task selection policy that defines a policy for assigning tasks from a set of possible tasks to agents classified as being included in the possible agent category; classifying the agent as being included in a corresponding agent category based on the classification scores; selecting one or more tasks to be performed by the agent in the environment based on the task selection policy of the corresponding agent category; and transmitting, to the agent, data defining the selected tasks to be performed by the agent in the environment.

In some implementations, the method further comprises, prior to receiving the agent trajectory that characterizes interaction of the agent with the environment to perform one or more initial tasks in the environment: receiving a plurality of baseline agent trajectories that each characterize interaction of a respective baseline agent with the environment to perform one or more initial tasks in the environment; and determining the set of possible agent categories based on the plurality of baseline agent trajectories.

In some implementations, determining the set of possible agent categories based on the plurality of baseline agent trajectories comprises: applying a clustering operation to the plurality of baseline agent trajectories to partition the plurality of baseline agent trajectories into a set of clusters, wherein each cluster of baseline agent trajectories represents a respective agent category.

In some implementations, processing the agent trajectory using an agent classification model to generate a classification output that comprises a respective classification score for each agent category in the set of possible agent categories comprises, for each agent category: determining a similarity measure between: (i) the agent trajectory, and (ii) the cluster of baseline agent trajectories representing the agent category.

In some implementations, the agent classification model is a machine learning model that has been trained on a set of training examples, wherein each training example comprises: (i) a training input that specifies a respective baseline agent trajectory, and (ii) a target output that specifies a cluster that includes the baseline agent trajectory.

In some implementations, the method further comprises, after determining the set of possible agent categories, determining the respective task selection policy for each agent category, comprising, for each agent category: initializing the task selection policy for the agent category to a default policy.

In some implementations, classifying the agent as being included in a corresponding agent category based on the classification scores comprises: classifying the agent as being included in an agent category associated with a highest classification score.

In some implementations, the method further comprises: evaluating a result of the tasks performed by the agent in the environment; and updating the task selection policy of the corresponding agent category based at least in part on the result of the tasks performed by the agent in the environment.

In some implementations, updating the task selection policy of the corresponding agent category based at least in part on the result of the tasks performed by the agent in the environment comprises: updating the task selection policy to optimize an objective function that depends on the result of the tasks performed by the agent in the environment.

In some implementations, the objective function measures a performance of the agent on the tasks performed by the agent in the environment.

In some implementations, the objective function measures a learning progress of the agent that results from the tasks performed by the agent in the environment.

In some implementations, updating the task selection policy to optimize the objective function that depends on the result of the tasks performed by the agent in the environment comprises: updating the task selection policy using a black box optimization technique.

In some implementations, selecting one or more tasks to be performed by the agent in the environment based on the task selection policy of the corresponding agent category comprises: selecting the one or more tasks from a predefined sequence of tasks associated with the task selection policy.

In some implementations, selecting one or more tasks to be performed by the agent in the environment based on the task selection policy of the corresponding agent category comprises: sampling the one or more tasks from a collection of tasks in accordance with a probability distribution over the collection of tasks.

In some implementations, the method further comprises, after classifying the agent as being included in the corresponding agent category based on the classification scores: adding the agent trajectory that characterizes interaction of the agent with the environment to perform the one or more initial tasks in the environment to a cluster of agent trajectories representing the corresponding agent category; evaluating a diversity metric that measures a diversity of the agent trajectories in the cluster of agent trajectories representing the corresponding agent category; and in response to determining that the diversity metric satisfies a threshold, splitting the agent category into a plurality of new agent categories and initializing a respective task selection policy for each of the new agent categories.

In some implementations, the agent is a mechanical agent, the environment is a real-world environment, and the one or more tasks to be performed by the agent in the environment involve navigating through the real-world environment.

In some implementations, the agent is a learning agent, the environment is a learning environment, and the one or more tasks to be performed by the agent in the environment are learning tasks.

In some implementations, the agent trajectory that characterizes interaction of the agent with the environment to perform the one or more initial tasks in the environment defines actions performed by the agent in the environment to perform the one or more initial tasks in the environment.

According to another aspect, there is provided a system comprising: one or more computers; and one or more storage devices communicatively coupled to the one or more computers, wherein the one or more storage devices store instructions that, when executed by the one or more computers, cause the one or more computers to perform operations of the methods described herein.

According to another aspect, there are provided one or more non-transitory computer storage media storing instructions that when executed by one or more computers cause the one or more computers to perform operations of the methods described herein.

Particular embodiments of the subject matter described in this specification can be implemented so as to realize one or more of the following advantages.

The task selection system described in this specification selects tasks for an agent in an environment based on an agent category classification of the agent. The system can generate the agent category classification of an agent by processing an initial trajectory that characterizes interaction of the agent with the environment to perform one or more initial tasks in the environment using an agent classification model. The initial trajectory of the agent can implicitly encode information characterizing features and characteristics of the agent, including the strategy the agent implements to perform the initial tasks, how effectively the agent performs the initial tasks, and various strengths and weaknesses of the agent.

After classifying the agent into an agent category, the task selection system selects tasks to be performed by the agent using a task selection policy associated with the agent category. The task selection system maintains a respective task selection policy associated with each agent category, where the task selection policy associated with an agent category can be optimized to select tasks tailored toward the agents included in the agent category. For example, the task selection policy can be optimized to select tasks that enable agents included in the agent category to achieve a high performance on the selected tasks. As another example, the task selection policy can be optimized to select tasks that are challenging for agents included in the agent category, e.g., such that by performing the selected tasks, the agents included in the agent category can maximize their learning progress.

By maintaining and optimizing respective task selection policies associated with each agent category in a set of agent categories, and assigning tasks to agents based on their agent category classification, the system enables more efficient use of resources, e.g., time, energy, computing power, and/or memory. In particular, the task selection policy can optimize the task selection policy associated with each agent category to enable an overall objective of the task selection system to be achieved more rapidly and with greater reliability. The overall objective may be, e.g., maximizing the performance of each agent on the tasks assigned to that agent, or maximizing the learning progress of each agent.

The task selection system can determine the set of agent categories (i.e., each of which are subsequently associated with a respective task selection policy) by an automated and data-driven approach. For example, the task selection system can determine the set of agent categories by applying a clustering operation to a collection of agent trajectories (i.e., each of which characterize interaction of a respective agent with the environment to perform a respective task). The clustering operation can define a partition of the collection of agent trajectories into a set of clusters (groups), such that trajectories in the same cluster tend to be more similar than trajectories in different clusters. Determining the set of agent categories by clustering the collection of agent trajectories enables the task selection system to identify coherent clusters of agent trajectories sharing similar properties based on complex patterns and correlations well beyond what could be analyzed by a human or solely in the human mind.

The task selection system can adaptively update the set of agent categories and the respective task selection policy associated with each agent category over time. For example, the task selection system can update the set of agent categories, e.g., by splitting an agent category into two or more separate agent categories in response to determining that the agent trajectories of agents in the agent category satisfy a diversity criterion. As another example, the task selection system can optimize the task selection policy associated with an agent category, e.g., to increase the performance or the learning progress of agents included in the agent category. By adaptively updating the set of agent categories and their associated task selection policies, the task selection system can more effectively tailor the tasks selected for agents.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
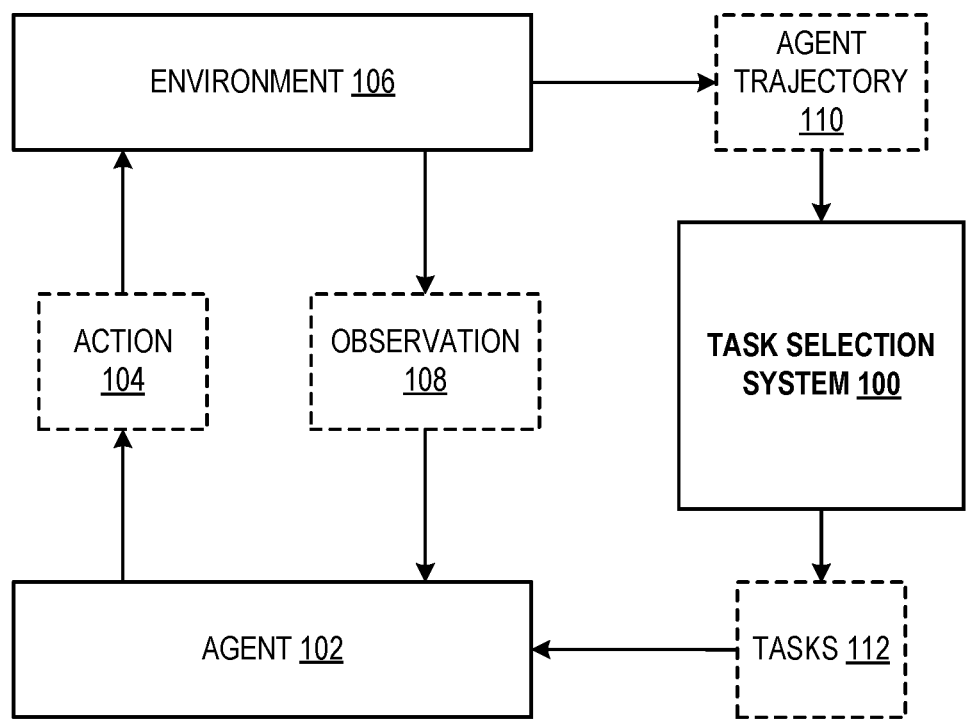
FIG. 1 is a block diagram showing an environment and a task selection system that selects tasks to be performed by an agent in the environment.

FIG. 1 shows an environment and a task selection system that selects tasks to be performed by an agent in the environment.

The task selection system 100 receives data defining an agent trajectory 110 that characterizes interaction of an agent 102 with an environment 106 to perform an initial set of one or more tasks in the environment 106. The task selection system processes the agent trajectory 110 to select a set of one or more subsequent tasks 112 for the agent to perform in the environment.

The agent 102 can perform actions 104 to interact with the environment 106 in order to complete a task 112 in the environment. As the agent 102 performs actions 104 to interact with the environment 106, the agent can receive observations 108 that include data characterizing states of the environment 106 that result from the actions 104 performed by the agent 102. The agent can perform multiple actions 104 while interacting with the environment 106 to complete a task 112, and, in response to each action, receive a respective observation 108 including data characterizing the resulting state of the environment. The agent trajectory 110 can include a sequence of actions performed by the agent in the environment, or an interleaved sequence of actions and observations of the environment, e.g., an interleaved sequence of the actions 104 and corresponding observations 108.

Generally, the environment 106 can be dynamic in response to the agent 102 performing actions 104 in the environment 106. That is, the agent 102 performing the action 104 in the environment 106 can change the environment 106, e.g., by consuming a resource in the environment 106 or triggering a condition set to change the environment 106.

In some implementations, the environment is a real-world environment and the agent is a mechanical agent interacting with the real-world environment, e.g., moving within the real-world environment (by translation and/or rotation in the environment, and/or by changing its configuration) and/or modifying the real-world environment. For example, the agent can be a robot interacting with the environment, e.g., to locate an object of interest in the environment, to move an object of interest to a specified location in the environment, to physically manipulate an object of interest in the environment, or to navigate to a specified destination in the environment; or the agent can be an autonomous or semi-autonomous land, air, sea, or space vehicle navigating through the environment to a specified destination in the environment.

For example, the mechanical agent can be a delivery agent, e.g., a delivery drone in a real-world environment (e.g., in a city) and the tasks can be delivering packages, e.g., mail packages from a delivery company, or food packages from restaurants (e.g., pizza, or other takeout or takeaway options).

In another example, the mechanical agent can be an autonomous or semi-autonomous vehicle, in a real-world environment, and each task can include transporting one or more people from a respective point A to a respective point B in the real-world environment. The autonomous or semi-autonomous vehicle can be a sedan, SUV, a pickup truck, a bus, tuk-tuk, or any other appropriate vehicle for transporting people.

In another example, the one or more tasks can be learning tasks. The agent can be a student in a learning environment (e.g., a classroom setting, vocational training site, or a virtual classroom), and the task selection system can supply tasks defining a learning curriculum for the student to efficiently acquire mastery of a particular subject. For example, the task selection system can present particular tasks in a particular order to the student (e.g., particular problems and readings in a particular order for mathematics, economics, or other academic subjects in a classroom setting, or particular experiments or physical tasks in a particular order for experimental sciences or vocational training). Actions can include completing projects, or answering questions or problems assigned by the task selection system. Observations can include remaining tasks or problems to perform, a number of problems or projects successfully completed, a respective quality grade (e.g., represented by a numerical value) assigned to each completed problem or project, an order of tasks completed, etc.

In some implementations the environment is a simulated environment and the agent is implemented as one or more computers interacting with the simulated environment.

For example, the simulated environment can be a simulation of a robot or vehicle and the task selection system can be trained on the simulation. For example, the simulated environment can be a motion simulation environment, e.g., a driving simulation or a flight simulation, and the agent can be a simulated vehicle navigating through the motion simulation. In these implementations, the actions can be control inputs to control the simulated user or simulated vehicle.

Generally in the case of a simulated environment the observations can include simulated versions of one or more of the previously described observations or types of observations and the actions can include simulated versions of one or more of the previously described actions or types of actions.

Once the agent 102 has performed one or more actions 104 in the environment 106 to complete the tasks 112, the task selection system 100 can select one or more new tasks to be performed by the agent 102. For example, the task selection system 100 can process the agent trajectory 110 characterizing the interaction of the agent 102 with the environment 106 to perform the tasks 112 to select one or more new tasks to be performed by the agent 102. The task selection system 100 can continue selecting tasks to be performed by the agent 102 (e.g., from a dynamic set of tasks, or a static set of tasks) until a stopping condition is reached, such as the completion of a predefined set of tasks, as is described in more detail below.

Figure 2:
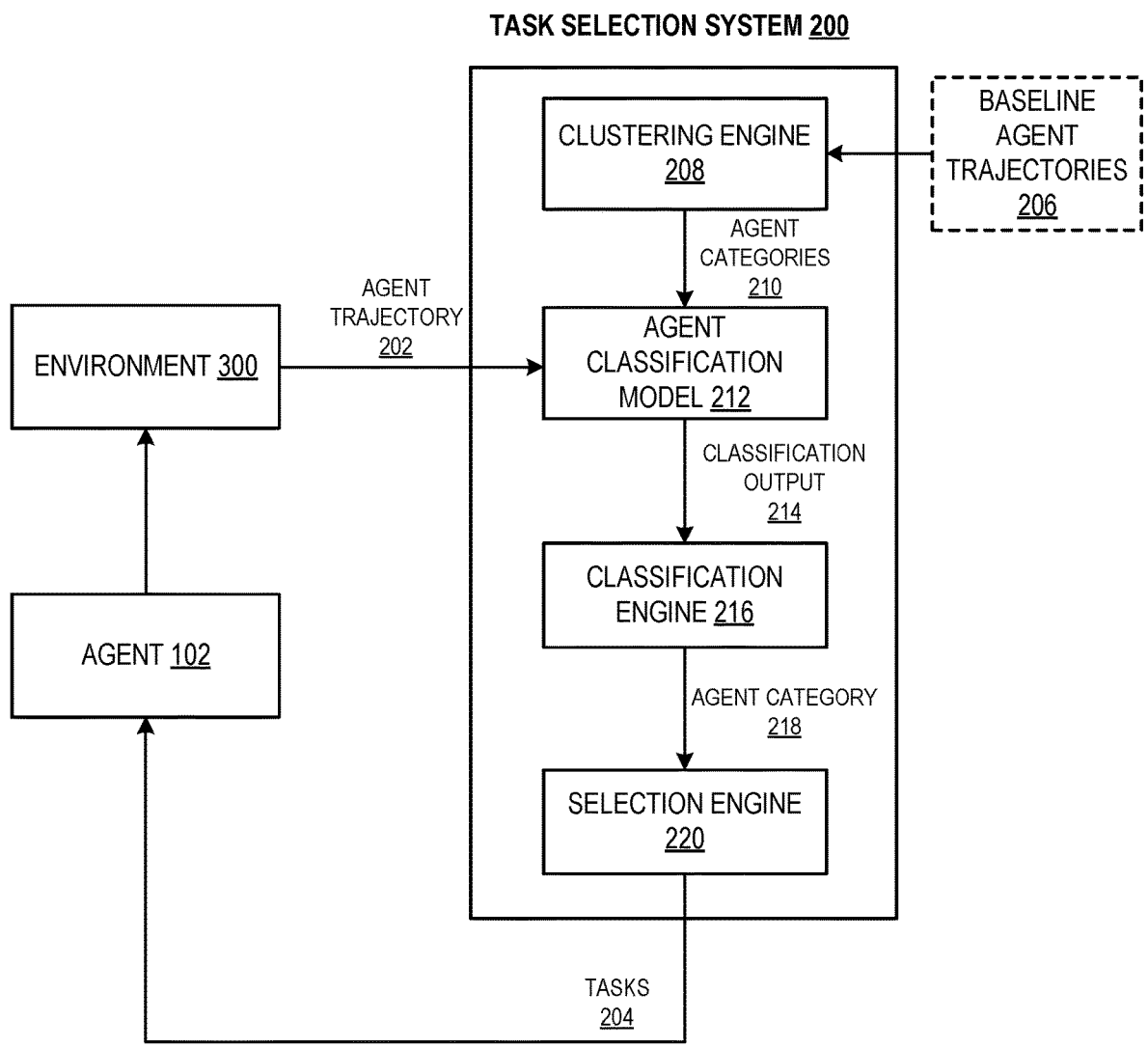
FIG. 2 is a block diagram of an example task selection system.

FIG. 2 shows an example task selection system 200. The task selection system 200 is an example of a system implemented as computer programs on one or more computers in one or more locations in which the systems, components, and techniques described below are implemented.

The task selection system 200 receives an agent trajectory 202 characterizing an agent 102 interacting with an environment 300 to perform one or more tasks in the environment 300, and selects one or more tasks 204 for the agent 102 to perform in the environment 300. The task selection system can determine an agent category for the agent based on the agent trajectory 202, and select tasks for the agent using a task selection policy associated with the agent category, as is described below.

The agent can be any appropriate agent, and the task selection system 200 can select any appropriate tasks to be performed by the agent. For example, as described above, the agent can be a mechanical agent interacting with a real-world environment, and the task selection system 200 can select delivery tasks for the mechanical agent. As another example, the agent can be a learning agent interacting with a learning environment, and the task selection system 200 can select learning tasks for the agent to perform in the learning environment.

The task selection system 200 includes a clustering engine 208, an agent classification model 212, a classification engine 216, and a selection engine 220, each of which are described in more detail below.

The clustering engine 208 is configured to process a set of "baseline" agent trajectories 206 to determine a set of agent categories 210. To determine the agent categories 210, the clustering engine 208 can partition the baseline agent trajectories 206 into multiple clusters (groups), where each cluster defines a respective agent category. That is, the clustering engine 208 can apply a clustering operation to partition the set of baseline agent trajectories 206 into a set of clusters, where baseline agent trajectories in the same cluster tend to be more similar than baseline agent trajectories in different clusters. Example techniques for determining the set of agent categories 210 are described in more detail below with respect to FIG. 3 and FIG. 5.

Each baseline agent trajectory 206 can characterize interaction of a "baseline" agent with the environment 300 to perform one or more initial tasks in the environment. For example, each baseline agent can be an agent from an initial set of agents whose agent trajectories are processed to generate the agent categories. Each baseline agent trajectory can include a sequence of actions performed by the baseline agent in the environment, or an interleaved sequence of actions and observations of the environment (e.g., where each observation characterizes a state of the environment resulting from a respective action performed by the baseline agent in the environment).

Generally, an agent trajectory can be represented in any appropriate manner, e.g., as an ordered collection of numerical values, e.g., as a vector, matrix, or other tensor of numerical values. For example, each action and each observation in the agent trajectory can be represented by a respective tensor of numerical values, and the agent trajectory can be defined by the ordered concatenation of the tensors representing the actions and the observations in the agent trajectory.

The set of agent categories 210 determined by the clustering engine 208 can define a partition of the set of baseline agents into respective agent categories. For example, each baseline agent can be classified as being included in the agent category 210 that includes the corresponding baseline agent trajectory 206 characterizing interaction of the baseline agent with the environment.

Baseline agents included in the same agent category tend to be more similar than baseline agents included in different agent categories. Generally, baseline agents included in the same agent category may share similar characteristics, implement similar strategies to interact with the environment, and more generally share similar strengths and weaknesses. For example, for mechanical delivery agents, the baseline agents may be grouped into agent categories based on features characterizing their performance in completing deliveries, e.g., package weights carried, routes taken, total duration of deliveries, range of altitudes along the route, differences in route taken based on physical locations at multiple time points, etc. As another example, for learning agents, the baseline agents may be grouped into agent categories based on their learning strategies (e.g., visual learning, auditory learning, kinetic learning, etc.), their learning speed (e.g., fast learning or slow learning), their aptitude in various subjects, etc.

The agent classification model 212 is configured to process an agent trajectory 202 that characterizes interaction of the agent 102 with the environment 300 to perform one or more "initial" tasks in the environment 300. The set of initial tasks can be a predefined set of initial tasks that are provided to the agent 102 by the task selection system 200. The set of initial tasks can be understood as "diagnostic" tasks that the task selection system 200 assigns to the agent 102 in order to determine an initial agent trajectory 202 that implicitly represents properties and characteristics of the agent 102.

The set of initial tasks can include any appropriate tasks. For example, if the agent is a mechanical agent interacting with a real-world environment to perform deliveries, then the set of initial tasks can include a set of delivery tasks involving delivering varies types of packages (e.g., of various weights and sizes) to various destinations (e.g., destinations in various neighborhoods).

In this example, the resulting agent trajectory 202 can characterize the capabilities and performance of the agent in the context of performing deliveries. As another example, if the agent is a learning agent interacting with a learning environment to achieve mastery of a subject, then the set of initial tasks can involve performing various learning tasks (e.g., including completing assignments, quizzes, or both). In this example, the resulting agent trajectory 202 can characterize the aptitude and learning strategies of the learning agent.

The agent classification model 212 (or "agent classification engine") processes the agent trajectory 202 to generate a classification output 214. The classification output 214 can include a respective classification score for each agent category in the set of agent categories 210. Generally, the classification score for an agent category 210 can be represented as a numerical value. For example, the respective classification score for each agent category can represent a likelihood that the agent should be included in the agent category.

The agent classification model 212 can generate the classification output 214 in any of a variety of ways. A few example techniques by which the agent classification model 212 can generate the classification output are described next.

In one example, to determine the classification output 214, the agent classification model 212 can determine a respective classification score for each agent category by measuring a similarity between: (i) the agent trajectory 202 of the agent 102, and (ii) a cluster of baseline agent trajectories defining the agent category. The agent classification model 212 can measure a similarity between the agent trajectory 202 and a cluster of baseline agent trajectories, e.g., by measuring a similarity between: (i) the agent trajectory 202, and (ii) a centroid of the cluster of baseline agent trajectories. The centroid of the cluster of baseline agent trajectories can be, e.g., a mean or median of the baseline agent trajectories included in the cluster of baseline agent trajectories. The task selection system can measure the similarity using any appropriate similarity measure, e.g., a similarity measure based on a Euclidean distance function or an $L_2$ distance function.

In another example, the agent classification model 212 can be a machine learning model that is configured to process an agent trajectory to generate a respective classification output, i.e., that defines a respective score for each agent category in the set of agent categories. The agent classification model can be trained on a set of training examples that each include: (i) a baseline agent trajectory, and (ii) a target output that specifies an agent category of the baseline agent trajectory. In particular, for each training example, the agent classification model can be trained to process the baseline agent trajectory of the training example to generate the target output specified by the training example. The machine learning model can be any appropriate model having a set of trainable parameters that can be trained on a set of training examples, e.g., a neural network model, a random forest model, or support vector machine model.

The classification engine 216 is configured to process the classification output 214 to determine an agent category 218 of the agent 102. The agent category 218 can be an agent category which is predicted to best match the agent trajectory 202 of the agent 102. The classification engine 216 can select the agent category 218 based on the classification output 214, e.g., by selecting the agent category corresponding to the highest classification score in the classification output 214.

Optionally, after classifying the agent 102 into an agent category 218, the task selection system 200 can add the agent trajectory 202 of the agent 102 to the cluster of agent trajectories that defines the agent category 218 of the agent. That is, the task selection system 200 can augment the cluster of agent trajectories defining the agent category 218 of the agent 102 with the agent trajectory 202 of the agent 102. Thus the agent trajectory 202 of the agent 102 can influence the manner in which the agent classification model 212 classifies future agents into corresponding agent categories. In implementations where the agent classification model 212 is a machine learning model (as described above), the task selection system 200 can periodically re-train the agent classification model on the updated clusters of the trajectories associated with each agent category.

The selection engine 220 is configured to select one or more tasks 204 for the agent to perform in the environment 300 based on the agent category 218. The selection engine 220 can include a respective task selection policy associated with each agent category, so that the selection engine 220 selects the tasks 204 based on the task selection policy corresponding to the agent category 218. Generally, a "task selection policy" can refer to any appropriate policy that defines a criterion for selecting tasks from a set of tasks. A few examples of task selection policies that can be associated with an agent category are described next.

In one example, the task selection policy associated with an agent category can define a sequence of tasks. In this example, the selection engine 220 can sequentially select tasks from the sequence of tasks, i.e., starting from the first task in the sequence of tasks and in accordance with the ordering of the tasks in the sequence of tasks.

In another example, the task selection policy associated with an agent category can define a set of sequences of tasks, i.e., that includes multiple sequences of tasks, and a probability distribution over the set of sequences of tasks, i.e., that associates a respective probability with each sequence of tasks. In this example, the task selection engine 220 can first select a sequence of tasks, e.g., by sampling from the set of sequences of tasks in accordance with the probability distribution over the set of sequences of tasks. After sampling a sequence of tasks, the task selection policy can sequentially select tasks from the sequence of tasks, i.e., starting from the first task in the sequence of tasks and in accordance with the ordering of the tasks in the sequence of tasks.

In another example, the task selection policy associated with an agent category can define a probability distribution over a set of tasks. In this example, the selection engine 220 can select tasks from the set of tasks, e.g., by sampling from the set of tasks in accordance with the probability distribution over the set of tasks. Optionally, the selection engine 220 can select tasks to be performed by the agent without replacement, i.e., such that once the agent performs a particular task, that task is removed from the set of tasks and is not repeated by the agent.

The selection engine 220 can select any appropriate tasks 204 to be performed by the agent 102. A few examples of tasks 204 that the selection engine 220 can select for an agent 102 are described next.

In one example, for a delivery drone in a real-world environment, the selected tasks can include one or more delivery tasks for the delivery drone that vary in expected delivery times (e.g., 30 minutes, 2 hours, or 5 days), in package size, shape, and/or weight (e.g., 1 oz envelopes, 5 lb. boxes, or 500 lb. freight containers), in target delivery destinations relative to current package locations (e.g., 500 ft. down the same street, 0.5 miles across a river in the same city, or 200 miles away in a different city), and so on.

In another example, for a learning agent in a learning environment, the task selection system 200 can select learning tasks that increase in difficulty at various paces, that include different learning tasks (e.g., reading articles, watching videos, completing practical problems, completing theoretical exercises, etc.), that cover different topic areas (e.g., mathematics, economics, etc.), and so on.

Generally, each agent category in the set of agent categories can be associated with a different task selection policy, and each task selection policy can select tasks from a different set of tasks. For example, in the context of the task selection system 200 selecting learning tasks, one agent category can be associated with a set of tasks corresponding to a particular subject area or combination of subject areas, and to a particular level of difficulty. Moreover, the number of tasks in a set of tasks associated with one agent category can be different than the number of tasks in a set of tasks associated with another agent category. The set of tasks associated with an agent category can also dynamically change over time, e.g., as certain existing tasks are removed from the set of tasks, or as new tasks are added to the set of tasks.

The task selection system 200 transmits, to the agent 102, data defining the selected tasks 204 to be performed by the agent in the environment 300. For example, for a mechanical agent, the task selection system 200 can be on-board the agent, or the task selection system 200 can transmit the tasks 204 via a computer network, internet local area network (LAN) or a wide area network (WAN). In another example, for a learning agent, the task selection system 200 can transmit the selected tasks 204 to the learning agent by transmitting a learning curriculum defining a sequence of learning tasks to a user device of the learning agent, e.g., a mobile phone, tablet, or personal computer of the learning agent.

The task selection system 200 can continue selecting tasks for the agent 102, in accordance with the task selection policy associated with the agent category of the agent, until a stopping criterion is satisfied. The stopping criterion may be, e.g., that the agent has completed every task in a set of tasks from which the task selection policy selects tasks to be performed by the agent, or that the agent achieves at least a threshold level of performance on a "validation" task. In the context of a learning agent, the validation task may be a task that tests the proficiency of the learning agent in a particular subject area.

The task selection system 200 can respond in any of a variety of possible ways after determining that a stopping criterion has been satisfied. For example, the task selection system 200 can refrain from selecting further tasks to be performed by the agent 102. As another example, the task selection system 200 can re-classify the agent 102 into a new agent category, e.g., by processing agent trajectories 202 characterizing interaction of the agent with the environment while performing tasks selected by the task selection system 200. The task selection engine 200 can then select new tasks to be performed by the agent 102 in accordance with the task selection policy associated with the new agent category.

Re-classifying an agent into a new agent category can be appropriate, e.g., to account for changes to the agent resulting from the agent having performed the tasks selected in accordance with the task selection policy associated with the previous agent category of the agent.

For one example, the agent may have learned from interacting with the environment to perform the tasks selected in accordance with the task selection policy associated with the previous agent category of the agent. The agent can be a learning agent that has achieved mastery in a learning topic (e.g., mathematics, physics, etc.), in a learning level of a learning topic (e.g., introductory, intermediate, advanced), or both. That is, the learning agent can have learned sufficient material to be reclassified into a different agent category and to receive tasks relevant to that agent category (e.g., more difficult tasks, a higher frequency of tasks, tasks in a next learning level of the learning topic(s), etc.).

In another example, the agent can have a changed set of characteristics from interacting with the environment. The agent can be a mechanical agent in a real-world environment that has suffered damage while performing one or more previous tasks. The system can update the agent category for the damaged agent to reflect one or more changes in the mechanical agent resulting from the damage, e.g., limited mobility, slower maximum speed, reduced weight capacity, etc.

Optionally, the task selection system 200 can repeatedly update the respective task selection policy associated with each agent category, e.g., to optimize an objective function. Alternatively, the task selection system 200 can include a static set of task selection policies. In one example, each agent category can be associated with a fixed task selection policy from the static set of task selection policies. In another example, the task selection system 200 can update which agent category is associated with which task selection policy.

The objective function can be any appropriate objective function. For example, the objective function can measure the performance of each agent on the tasks selected for that agent. In this example, optimizing the objective function encourages the task selection policy for an agent category to select tasks for agents in the agent category that can be effectively performed by agents in the agent category. In another example, the objective function can measure a respective learning progress of each agent. The learning progress of an agent can measure, e.g., a number of tasks that the agent must perform until the agent achieves at least a threshold level of performance on a validation task, or a duration of time that the agent must perform tasks until the agent achieves at least a threshold level of performance on a validation task.

Updating the task selection policies to optimize the objective function can encourage each task selection policy to select tasks that are tailored and adapted toward the agents included in the agent category associated with the task selection policy. Example techniques for updating task selection policies to optimize an objective function are described in more detail below with reference to FIG. 4.

The task selection system 200 can also update the set of agent categories, e.g., as the cluster of agent trajectories defining each agent category changes over time as a result of being augmented with new agent trajectories. For example, in response to determining that a cluster of agent trajectories defining an agent category satisfies a diversity criterion, the task selection system 200 can split the cluster of agent trajectories into two or more new clusters that define two or more ne agent categories. Example techniques for updating the set of agent categories are described in more detail below with reference to FIG. 6.

Figure 3:
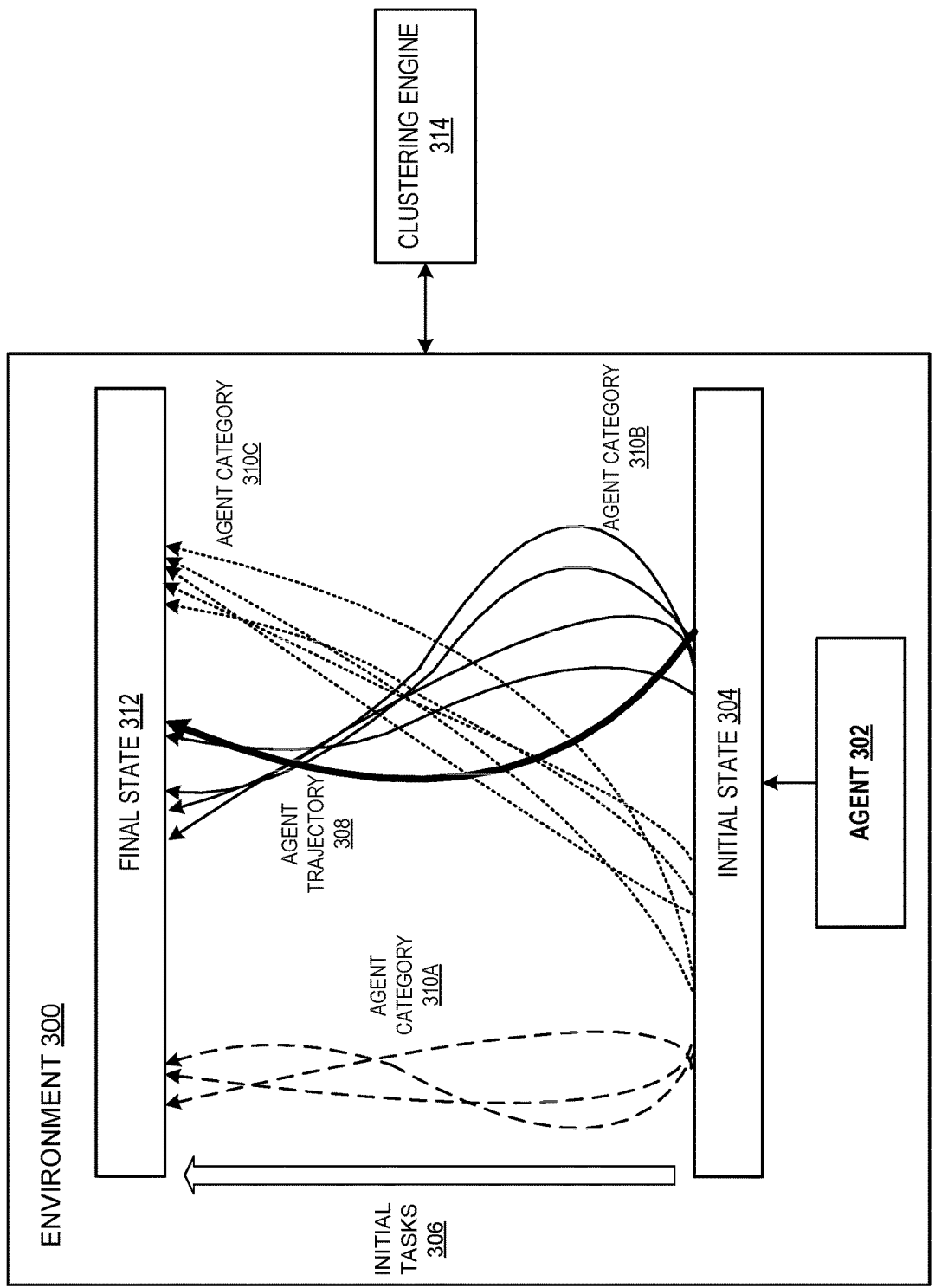
FIG. 3 illustrates an agent trajectory in comparison with the respective baseline agent trajectories for multiple agent categories as determined by a clustering engine.

FIG. 3 illustrates an agent trajectory of an agent 302 in comparison with respective baseline agent trajectories for multiple agent categories as determined by a clustering engine.

An agent 302 performs a set of initial tasks 306 in an environment 300. The agent 302 can perform the initial tasks 306 beginning from an initial state 304 in the environment 300. Once the agent 302 performs the initial tasks 306, the agent 302 arrives at a final state 312 in the environment 300. An agent trajectory 308 characterizes the agent 302 interacting with the environment 300 to perform the initial tasks 306. That is, the agent trajectory 308 can characterize the agent 302 beginning from initial state 304, performing initial tasks 306, and arriving at final state 312. The agent trajectory 308 can include a sequence of actions performed by the agent 302 to perform the initial tasks, or an interleaved sequence of actions and respective resulting observations.

For example, the agent 302 can be a mechanical agent, such as a delivery drone, and the initial tasks 306 can be delivering packages in a real-world environment. The initial state 304 can characterize the agent 302 in the environment 300 with the packages not yet delivered, and the final state 312 can characterize the agent 302 in the environment 300 with the packages successfully delivered or not yet delivered (e.g., if the agent 302 is unable to deliver one or more of the packages). The agent trajectory 308 can characterize a sequence of interleaved actions taken by the agent 302 and resulting observations of the environment between the initial state 304 and the final state 312 (e.g., including the success or failure of each delivery, the order of deliveries, time of deliveries, physical position of the delivery drone at multiple time points, and so on).

In another example, the agent 302 can be a learning agent in a learning environment. The initial set of tasks 306 can include, e.g., a multiple choice questionnaire related to a learning topic (e.g., mathematics, economics, computer programming, etc.). The agent trajectory 308 can represent, e.g., a sequence of responses of the learning agent to each question of the questionnaire.

In another example, the initial set of tasks for a learning agent can include one or more open-ended problems, e.g., one or more word problems for mathematics, economics, etc.; one or more computer programming tasks; or both.

In another example, the initial set of tasks for a learning agent can include interacting with a virtual learning environment using a virtual avatar to complete a set of experiment tasks, e.g., to perform chemistry experiments in a virtual learning environment to create specific compounds, perform certain chemical reactions, identify safe and unsafe laboratory procedures, identify safe and unsafe chemical compounds, or any combination of these.

In another example, the initial set of tasks for a learning agent can include interacting with other learning agents in a virtual learning environment. For example, for learning economics, the initial set of tasks can include one or more trading tasks. Where each learning agent starts with predetermined amounts of multiple resources, the one or more trading tasks can include to accumulate predetermined amounts of one or more of the multiple resources, such as money, lumber, steel, stock in a company, etc.

The agent trajectory 308 can be processed to determine an agent category for the agent 302 (e.g., using an agent classification model and classification engine, as described in FIG. 2). The determined agent category for the agent 302 can correspond to one of multiple agent categories determined by a clustering engine 314, e.g., agent category 310A, agent category 310B, and agent category 310C. The clustering engine 314 can determine the agent categories by applying a clustering operation to multiple baseline agent trajectories, where each agent category corresponds to a respective cluster of baseline agent trajectories, as is described below with respect to FIG. 5. The respective cluster of baseline agent trajectories for each agent category (e.g., 310A, 310B, and 310C) are illustrated in FIG. 3 using different types of lines. For example, agent category 310A is illustrated using dashed lines. Agent category 310B is illustrated using solid lines, and agent category 310C is illustrated using dotted lines. The agent trajectory 308 is shown using a bolded solid line, and can be classified as most similar to, e.g., agent category 310B (e.g., by an agent classification model and a classification engine, such as agent classification model 212 and classification engine 216 of FIG. 2).

Optionally, the system can update the agent categories at one or more time points after receiving additional baseline agent trajectories. For example, as new agents enter the environment 300, the system can receive a respective agent trajectory for each of the new agents interacting with the environment 300 to perform the set of initial tasks. The system can assign each of the new agents to a respective agent category based on the agent trajectory for the new agent, and include the agent trajectory for the new agent in the cluster of baseline agent trajectories associated with the agent category. After including N additional agent trajectories in the clusters corresponding to the agent categories, the system can again apply the clustering algorithm (e.g., as described in further detail with respect to FIG. 5) to the updated set of baseline agent trajectories to determine an updated set of agent categories.

Figure 6:
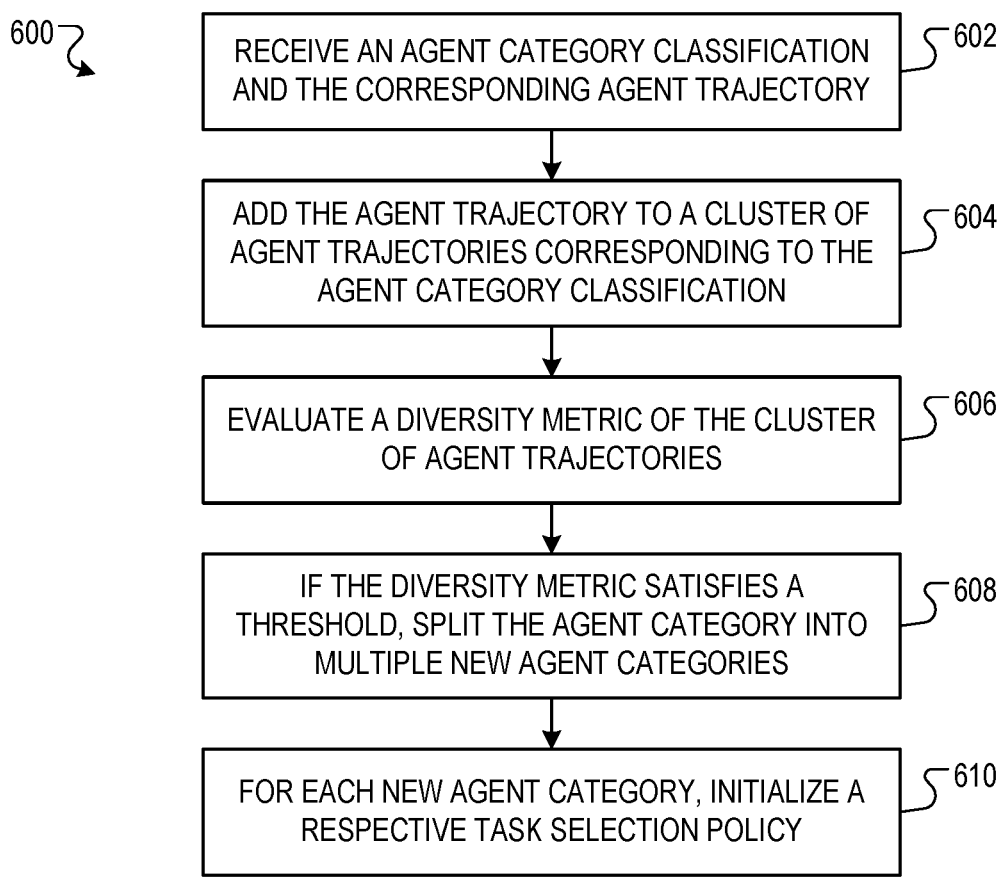
FIG. 6 is a flow diagram of an example process for splitting an agent category into multiple agent categories.

In another example, in response to determining that one or more of the clusters of agent trajectories defining respective agent categories satisfy a diversity criterion, the system can split each of clusters satisfying the diversity criterion into two or more new clusters, e.g., as described in further detail with respect to FIG. 6.

Figure 4:
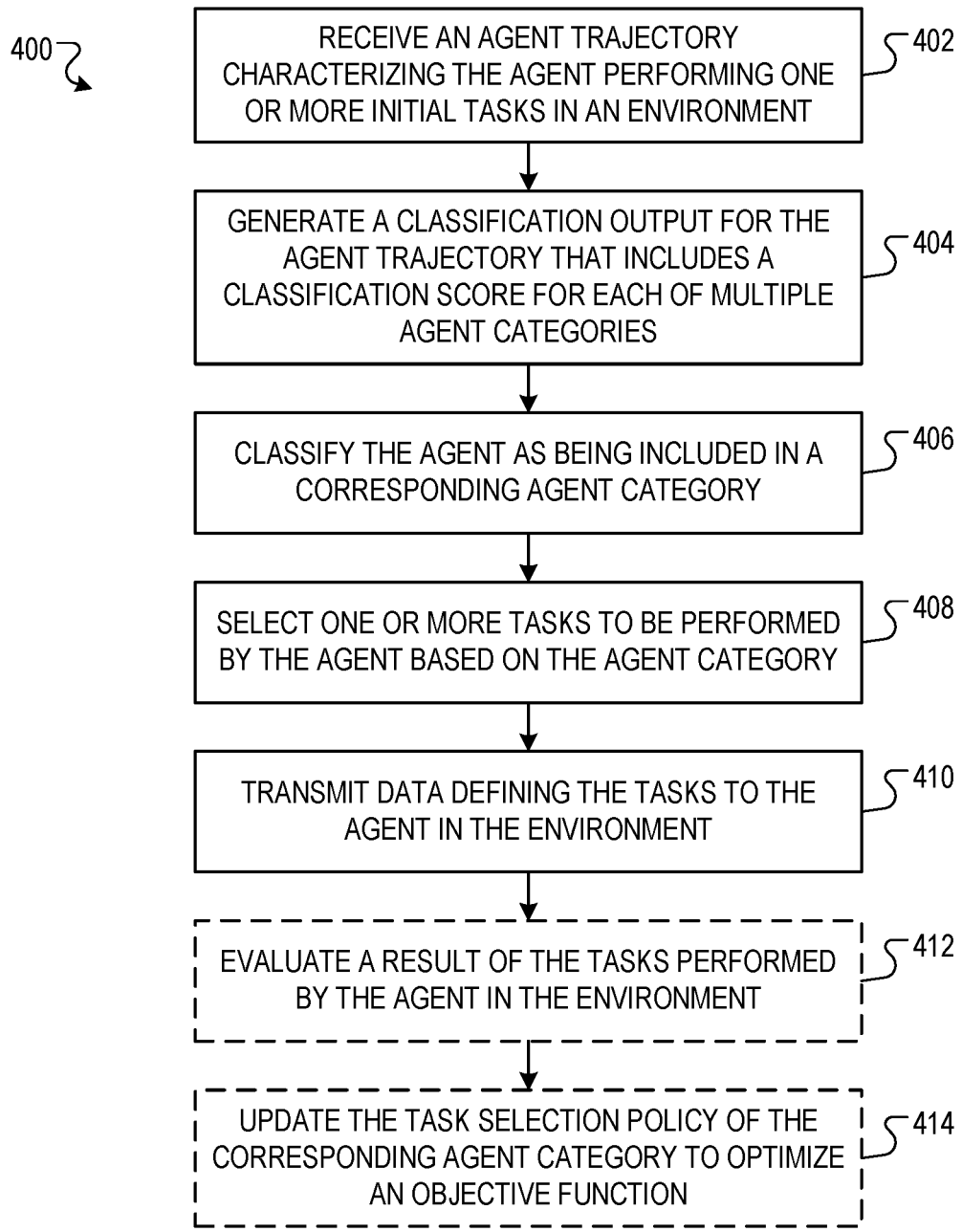
FIG. 4 is a flow diagram of an example process for selecting tasks for an agent based on an agent category.

FIG. 4 is a flow diagram of an example process for selecting tasks for an agent based on an agent category. For convenience, the process 400 will be described as being performed by a system of one or more computers located in one or more locations. For example, a task selection system, e.g., the task selection system 200 of FIG. 2, appropriately programmed in accordance with this specification, can perform the process 400.

The system receives an agent trajectory characterizing the agent interacting with an environment to perform one or more initial tasks in the environment (402). The agent trajectory can be represented, e.g., by an ordered collection of numerical values, such as a vector, matrix, or other tensor of numerical values.

For example, the agent can be a learning agent performing one or more initial learning tasks in a learning environment, where each initial learning task is determined to test a knowledge base and/or proficiency in a learning area. The initial tasks can include answering a multiple choice questionnaire, and the agent trajectory can include the agent's responses to the questions in the questionnaire.

In another example, the agent can be a mechanical agent, and the initial set of tasks can include delivery tasks, including delivering packages of varying weight in a variety of terrains, or various regions in a city. The agent trajectory for the mechanical agent can include a sequence of interleaved actions taken by the agent, states of the agent, and/or observations of the environment along a delivery path that the mechanical agent took to complete the delivery tasks (e.g., at predetermined time intervals). The actions can include, e.g., steering angles, accelerations, lock/unlock operations (e.g., of an on-board cargo compartment holding the packages), or any combination of these. The states of the agent can include, e.g., spatial coordinates, speed, heading, power consumption and/or battery or fuel reserves, use of on-board computational resources (e.g., memory or FLOPS), or any combination of these. The observations of the environment can include, e.g., relative positions and speeds of objects and other agents in the environment, weather conditions of the environment (e.g., temperature, precipitation, wind speed, etc.), feedback ratings from package recipients (e.g., audio recordings generated by the agent of the package recipient, or text and/or a numerical rating out of ten sent by the package recipient via a telecommunications network), or any combination of these.

The system generates a classification output for the agent trajectory that includes a respective classification score for each of multiple agent categories (404). The system can determine the respective classification score for each agent category, e.g., by determining a similarity measure between the agent trajectory and the cluster of baseline agent trajectories representing the agent category. For example, the system can determine the respective similarity measure for each agent category by computing a centroid trajectory of the baseline agent trajectories in the cluster (e.g., an average or median of the baseline agent trajectories) corresponding to the agent category. Then, the system can determine a similarity measure between the centroid trajectory for the cluster and the agent trajectory. The agent categories can be determined by applying a clustering operation to multiple baseline learning agent trajectories, as is described in further detail below with respect to FIG. 5.

The system classifies the agent as being included in a corresponding agent category (406). The system can classify the agent based on the classification scores. For example, the system can classify the agent as being included in the agent category corresponding to the highest classification score.

The system selects one or more tasks to be performed by the agent based on the agent category (408). Each agent category can be associated with a respective task selection policy that defines a policy for selecting tasks from a set of possible tasks for agents classified as being included in the agent category. For example, the system can select the one or more tasks from a predefined sequence of tasks associated with the task selection policy. In another example, the system can sample the one or more tasks from a collection of tasks in accordance with a probability distribution over the collection of tasks.

The system transmits data defining the tasks to the agent in the environment (410). For example, the task selection system can be on-board a mechanical agent, or can transmit the tasks to the mechanical agent via a computer network, internet local area network (LAN) or a wide area network (WAN). In another example, the agent can be a learning agent (e.g., a student) in an e-learning environment, and the system can transmit the selected tasks to the learning agent by sending prompts to the agent including instructions to perform the selected tasks.

Basing the task selection on at least the agent category classification (e.g., in addition to other properties of the agent) can enable the system to select a tailored set of tasks for the agent. Tailoring the selected tasks for the agent, can enable the system to make more efficient use of resources, such as computational resources (e.g., memory or RAM) or physical resources (e.g., by distributing delivery tasks across multiple delivery agents of varying delivery agent categories in a way that is predicted to require a least duration of time to deliver).

Optionally, the system can evaluate a result of the tasks performed by the agent in the environment (412). The system can evaluate the result of the tasks performed by the agent using one or more metrics relevant to the particular tasks.

For example, for a mechanical agent delivering packages in a real-world environment, the metric can measure packages successfully delivered (e.g., as a fraction of total packages assigned to the agent, or as a vector indicating success as a one or failure as a zero for each package), time duration to deliver the packages (e.g., measured in a time unit, such as seconds, as compared with a target duration), geometric efficiency in delivery path taken by the agent (e.g., which measures a difference between the delivery path taken by the agent and an optimal path planned by an external system, or which measures a redundancy in the delivery path, such as how often the agent retraces a previous path along its delivery route), or any combination thereof.

In another example, for a learning agent completing learning tasks in a learning environment, the metric can measure successfully completed tasks (e.g., as a fraction of total learning tasks given to the learning agent, or as a vector indicating success as a one or failure as a zero for each learning task), time duration to complete each learning task (e.g., as compared with a target time duration for each task), order of completion of the learning tasks (e.g., to measure a learning path as compared with other previous learning agents), performance on one or more subject exams (e.g., represented by scores for each question of each subject exam), novel or efficient sequences of actions to successfully complete the learning tasks (e.g., as compared with the performance and action sequences of other learning agents), or any combination thereof.

Optionally, the system can update the task selection policy of the corresponding agent category to optimize an objective function (414). The objective function can depend on the results of the tasks performed by the agent. For example, the objective function a measure a performance of the agent on the tasks selected for the agent, where the performance of the agent can measure any appropriate aspect of the results of the interaction of the agent with the environment. For example, for a learning agent, the objective function can measure performance of the learning agent on a validation task, e.g., a subject exam. As another example, for a learning agent, the objective function can measure a number of tasks performed by the learning agent until the learning agent achieves at least a threshold level of performance on a validation task, or a duration of time until the learning agent achieves at least a threshold level of performance on a validation task (e.g., a subject exam).

Generally, updating a task selection policy to optimize the objective function refers to updating the values of a set of parameters defining the task selection to encourage the selection of tasks that result in the objective function achieving a more optimal value (e.g., higher value). In some implementations, the task selection policy defines a probability distribution over a set of tasks, and the parameters of the task selection policy define a respective probability value for each task. In some implementations, the task selection policy defines a sequence of tasks, and the parameters of the task selection policy define an ordering of the tasks in the sequence of tasks. In some implementations, the task selection policy defines a probability distribution over a set of sequences of tasks, and the parameters of the task selection policy define: the respective ordering of the tasks in each sequence of tasks, a respective selection probability for each sequence of tasks, or both.

The system can update the parameters of the task selection policy, based on the results of the tasks selected for the agent by the task selection policy, using any appropriate optimization technique. For example, the optimization technique may be a black box optimization technique, e.g., an optimization technique that does not rely on differentiability of the objective function. An example of a black box optimization technique is described with reference to: Daniel Golovin, et al., "Google Vizier: A Service for Black Box Optimization", Proceedings of the $23^{rd}$ ACM SIGKDD International Conference on Knowledge Discovery and Data Mining, 13-17 Aug. 2017, which is incorporated herein by reference.

Dynamically updating the respective task selection policy for each agent category can enable the system to better tailor the tasks assigned to each agent, which can enable the system to make more efficient use of resources, such as time, power consumption, and/or computing power.

Optionally, the system can jointly update: (i) the parameters of the task selection policies associated with the agent categories, and (ii) a set of parameters of the agent classification model, to optimize the objective function. Jointly optimizing the task selection policies and the agent classification model can facilitate optimization of the objective function, e.g., by enabling synergies between the task selection policies and the agent classification model that would not be exploitable through separate optimization of task selection policies and the agent classification model.

Figure 5:
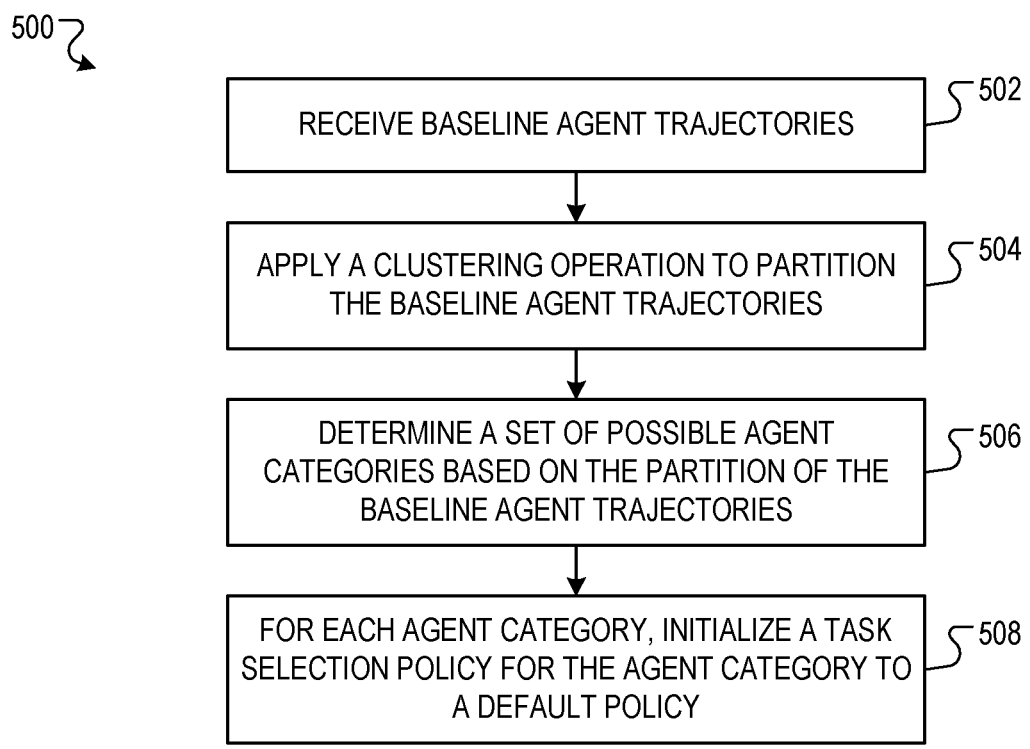
FIG. 5 is a flow diagram of an example process for determining a set of possible agent categories.

FIG. 5 is a flow diagram of an example process for determining a set of agent categories. For convenience, the process 500 will be described as being performed by a system of one or more computers located in one or more locations.

The system receives a set of baseline agent trajectories (502). Each baseline agent trajectory can be generated by a respective baseline agent (e.g., an agent from an initial set of agents) performing the initial set of tasks by interacting with the environment. For example, for learning agents, the learning agents can perform a set of learning tasks by interacting with the environment.

The system applies a clustering operation to partition the set of baseline agent trajectories into multiple clusters (504). That is, the system can apply the clustering operation to divide the baseline agent trajectories into clusters of similar agent trajectories, where each of the baseline agent trajectories in a respective cluster has a higher likelihood to be more similar to each other baseline agent trajectory in the same cluster than baseline agent trajectories in other clusters.

The system can apply any appropriate clustering operation to partition the set of baseline agent trajectories into multiple clusters, e.g., a k-means clustering operation, a hierarchical agglomerative clustering operation, or an expectation-maximization clustering operation. Generally, the clustering operation can be an iterative clustering operation, i.e., that updates the values of a set of clustering parameters over multiple iterations until a termination criterion is satisfied, where the values of the set of clustering parameters define a partition of set of baseline agent trajectories into multiple clusters.

The system determines a set of possible agent categories based on the partition of the baseline agent trajectories (506). Each agent category can correspond to a respective cluster of baseline agent trajectories. For example, each agent category can correspond to a central trajectory (e.g., an average trajectory or median trajectory) of the baseline agent trajectories in the corresponding cluster.

For each agent category, the system initializes a task selection policy for the agent category to a default policy (508). The respective default policy for an agent category can be determined in any appropriate way, e.g., manually, or randomly. For example, a respective default task selection policy can be initialized for each agent category by a human expert. As another example, for each agent category, the value of each parameter in a set of parameters defining the task selection policy for the agent category can be randomly selected, e.g., sampled from a predefined probability distribution.

The system can perform steps (502)-(508) one or more times. For example, the system can perform the steps (502)-(508) to determine a set of possible agent categories before the process 400, and then periodically again to maintain or update the agent categories given new baseline agent trajectory data. As the system accumulates additional baseline agent trajectory data, the corresponding agent categories can begin to change (e.g., becoming better defined, beginning to overlap, or becoming more respectively diverse).

FIG. 6 is a flow diagram of an example process for splitting an agent category into multiple categories. For convenience, the process 600 will be described as being performed by a system of one or more computers located in one or more locations.

The system receives data defining an agent trajectory and an agent category of the agent trajectory (602). The agent trajectory can characterize interaction of an agent with an environment to perform one or more tasks in the environment.

The system adds the agent trajectory to the cluster of agent trajectories corresponding to the agent category (604).

The system evaluates a diversity metric of the cluster of agent trajectories defining the agent category (606). The diversity metric of a cluster can measure a variance of the agent trajectories within the cluster. A higher diversity metric can indicate that there is a wider variety of baseline agent trajectories in the cluster. For example, for agent categories each associated with a respective centroid trajectory (e.g., a mean or median trajectory representing the mean or median of the respective agent trajectories within the cluster), the diversity metric can measure the standard deviation of a respective distance of each agent trajectory in the corresponding cluster from the centroid trajectory (e.g., computed using a Euclidean distance).

If the diversity metric satisfies a threshold, the system splits the agent category into multiple new agent categories (608). The system can split the agent category into multiple new agent categories all at once, or the system can split the agent category in a series of binary splits (i.e., splitting the agent category into two respective agent categories), where the system conducts a binary split of each new agent category that satisfies the diversity metric threshold. The system can cease the binary splitting once no new agent category satisfies the diversity metric threshold. The system can determine the respective baseline agent trajectories for each new agent category using a clustering operation on the cluster of baseline agent trajectories of the agent category to be split (e.g., k-means clustering on the baseline agent trajectories for the cluster, where k is the number of new agent categories to be formed, such as k=2 for a binary split).

For example, with a diversity metric measuring the standard deviation of the distance of each agent trajectory in the cluster from a centroid trajectory corresponding to the agent category, the system can split the agent category until the respective standard deviation of each new agent category lies below a predetermined threshold. In a particular example, the system can perform a series of binary splits. The system can apply an initial binary split to the baseline agent trajectories of the initial agent category to partition the baseline agent trajectories into two respective clusters. Then, the system can determine if each resulting cluster satisfies the diversity metric, and perform a respective binary split on each resulting cluster that satisfies the diversity metric. The system can continue to perform binary splits on resulting clusters until no resulting cluster satisfies the diversity metric.

In another example, the system can perform multiple different splits on the agent category, and keep one of them. As a particular example, the system can perform a sequence of k-means clustering operations on the baseline agent trajectories in the cluster corresponding to the agent category with an escalating value of k (i.e., where k defines the number of clusters), until no resulting cluster satisfies the diversity metric. That is, the system can apply a k-means clustering operation with k=2, then determine whether either of the two resulting clusters satisfies the diversity metric. If either satisfies the diversity metric, the system instead applies a k-means clustering operation with k=3 to the baseline agent trajectories of the cluster and determines if any of the three resulting clusters satisfies the diversity metric. If any satisfy the diversity metric, the system applies a k-means clustering operation with k=4 to the baseline agent trajectories, and so on, until the system determines that no resulting cluster satisfies the diversity metric. The system can keep the clusters from the first split to result in no cluster satisfying the diversity metric threshold.

For each new agent category, the system initializes a respective task selection policy (610). The respective default policy for a new agent category can be the same task selection policy as the task selection policy for the pre-split agent category. For example, for new agent categories generated by applying k-means clustering to an agent category, the task selection policy for each new agent category can be initialized as the task selection policy for the pre-split agent category.

Optionally, the system can update the task selection policy for each new agent category over time to better reflect the constituents of the new agent category, as described in further detail with respective to step (414) of FIG. 4.

Optionally, in some implementations, the system can determine that a merging criterion is satisfied for two agent categories, and in response to determining that the merging criterion is satisfied, the system can merge the two agent categories into a single (combined) agent category. The merging criterion for merging two agent categories can be, e.g., that a similarity between respective clusters of agent trajectories defining the two agent categories satisfies (e.g., exceeds) a threshold. The system can evaluate a similarity between respective clusters of agent trajectories in any of a variety of ways. For example, the system can compute a similarity between two clusters of agent trajectories by measuring a similarity between respective centroid trajectories of the clusters of agent trajectories. The system can measure a similarity between the centroid trajectories using any appropriate similarity measure, e.g., a Euclidean similarity measure or a cosine similarity measure.

Merging two agent categories into a combined agent category can refer to replacing the two original agent categories by the combined agent category, where the combined agent category is defined by the union of the respective clusters of agent trajectories corresponding to each original agent category.

After merging two agent categories into a combined agent category, the system can initialize a task selection policy for the combined agent category in any of a variety of possible ways. For example, the system can initialize the task selection policy for the combined agent category as the task selection policy for one of the original agent categories, e.g., the original agent category that includes the greatest number of agent trajectories. In another example, the system can initialize the task selection policy for the combined agent category as a combination of the task selection policies for the original agent categories. For example, the system can initialize the task selection policy for the combined agent category as an average of the task selection policies for the original agent categories, e.g., by defining the parameter values for the task selection policy for the combined agent category as an average of the parameter values of the task selection policies for the original agent categories.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   determining a set of possible agent categories, comprising:
      receiving a plurality of baseline agent trajectories that each characterize interaction of a respective baseline agent with an environment to perform one or more initial tasks in the environment; and
      clustering the plurality of baseline agent trajectories over a plurality of clustering iterations using an iterative numerical clustering technique to partition the plurality of baseline agent trajectories into a set of clusters, wherein each cluster of baseline agent trajectories represents a respective agent category;
   receiving an agent trajectory that characterizes interaction of an agent with the environment to perform one or more initial tasks in the environment;
   processing the agent trajectory using an agent classification model to generate a classification output that comprises a respective classification score for each agent category in the set of possible agent categories, wherein each possible agent category is associated with a respective task selection policy that defines a policy for assigning tasks from a set of possible tasks to agents classified as being included in the possible agent category;
   classifying the agent as being included in a corresponding agent category based on the classification scores;
   selecting one or more tasks to be performed by the agent in the environment based on the task selection policy of the corresponding agent category; and
   transmitting, to the agent, data defining the selected tasks to be performed by the agent in the environment.

2. The method of claim 1, wherein processing the agent trajectory using an agent classification model to generate a classification output that comprises a respective classification score for each agent category in the set of possible agent categories comprises, for each agent category:
  determining a similarity measure between: (i) the agent trajectory, and (ii) the cluster of baseline agent trajectories representing the agent category.

3. The method of claim 1, wherein the agent classification model is a machine learning model that has been trained on a set of training examples, wherein each training example comprises: (i) a training input that specifies a respective baseline agent trajectory, and (ii) a target output that specifies a cluster that includes the baseline agent trajectory.

4. The method of claim 1, further comprising, after determining the set of possible agent categories, determining the respective task selection policy for each agent category, comprising, for each agent category:
  initializing the task selection policy for the agent category to a default policy.

5. The method of claim 1, wherein classifying the agent as being included in a corresponding agent category based on the classification scores comprises:
  classifying the agent as being included in an agent category associated with a highest classification score.

6. The method of claim 1, further comprising:
  evaluating a result of the tasks performed by the agent in the environment;
  updating the task selection policy of the corresponding agent category based at least in part on the result of the tasks performed by the agent in the environment.

7. The method of claim 6, wherein updating the task selection policy of the corresponding agent category based at least in part on the result of the tasks performed by the agent in the environment comprises:
  updating the task selection policy to optimize an objective function that depends on the result of the tasks performed by the agent in the environment.

8. The method of claim 7, wherein the objective function measures a performance of the agent on the tasks performed by the agent in the environment.

9. The method of claim 7, wherein the objective function measures a learning progress of the agent that results from the tasks performed by the agent in the environment.

10. The method of claim 7, wherein updating the task selection policy to optimize the objective function that depends on the result of the tasks performed by the agent in the environment comprises:
  updating the task selection policy using a black box optimization technique.

11. The method of claim 1, wherein selecting one or more tasks to be performed by the agent in the environment based on the task selection policy of the corresponding agent category comprises:
  selecting the one or more tasks from a predefined sequence of tasks associated with the task selection policy.

12. The method of claim 1, wherein selecting one or more tasks to be performed by the agent in the environment based on the task selection policy of the corresponding agent category comprises:
  sampling the one or more tasks from a collection of tasks in accordance with a probability distribution over the collection of tasks.

13. The method of claim 1, further comprising, after classifying the agent as being included in the corresponding agent category based on the classification scores:
  adding the agent trajectory that characterizes interaction of the agent with the environment to perform the one or more initial tasks in the environment to a cluster of agent trajectories representing the corresponding agent category;
  evaluating a diversity metric that measures a diversity of the agent trajectories in the cluster of agent trajectories representing the corresponding agent category; and
  in response to determining that the diversity metric satisfies a threshold, splitting the agent category into a plurality of new agent categories and initializing a respective task selection policy for each of the new agent categories.

14. The method of claim 1, wherein the agent is a mechanical agent, the environment is a real-world environment, and the one or more tasks to be performed by the agent in the environment involve navigating through the real-world environment.

15. The method of claim 1, wherein the agent is a learning agent, the environment is a learning environment, and the one or more tasks to be performed by the agent in the environment are learning tasks.

16. The method of claim 1, wherein the agent trajectory that characterizes interaction of the agent with the environment to perform the one or more initial tasks in the environment defines actions performed by the agent in the environment to perform the one or more initial tasks in the environment.

17. A system comprising:
  one or more computers; and
  one or more storage devices communicatively coupled to the one or more computers, wherein the one or more storage devices store instructions that, when executed by the one or more computers, cause the one or more computers to perform operations comprising:
  determining a set of possible agent categories, comprising:
    receiving a plurality of baseline agent trajectories that each characterize interaction of a respective baseline agent with an environment to perform one or more initial tasks in the environment; and
    clustering the plurality of baseline agent trajectories over a plurality of clustering iterations using an iterative numerical clustering technique to partition the plurality of baseline agent trajectories into a set of clusters, wherein each cluster of baseline agent trajectories represents a respective agent category;
  receiving an agent trajectory that characterizes interaction of an agent with the environment to perform one or more initial tasks in the environment;
  processing the agent trajectory using an agent classification model to generate a classification output that comprises a respective classification score for each agent category in the set of possible agent categories, wherein each possible agent category is associated with a respective task selection policy that defines a policy for assigning tasks from a set of possible tasks to agents classified as being included in the possible agent category;
  classifying the agent as being included in a corresponding agent category based on the classification scores;
  selecting one or more tasks to be performed by the agent in the environment based on the task selection policy of the corresponding agent category; and
  transmitting, to the agent, data defining the selected tasks to be performed by the agent in the environment.

18. One or more non-transitory computer storage media storing instructions that when executed by one or more computers cause the one or more computers to perform operations comprising:
- determining a set of possible agent categories, comprising:
  - receiving a plurality of baseline agent trajectories that each characterize interaction of a respective baseline agent with an environment to perform one or more initial tasks in the environment; and
  - clustering the plurality of baseline agent trajectories over a plurality of clustering iterations using an iterative numerical clustering technique to partition the plurality of baseline agent trajectories into a set of clusters, wherein each cluster of baseline agent trajectories represents a respective agent category;
- receiving an agent trajectory that characterizes interaction of an agent with the environment to perform one or more initial tasks in the environment;
- processing the agent trajectory using an agent classification model to generate a classification output that comprises a respective classification score for each agent category in the set of possible agent categories,
  - wherein each possible agent category is associated with a respective task selection policy that defines a policy for assigning tasks from a set of possible tasks to agents classified as being included in the possible agent category;
- classifying the agent as being included in a corresponding agent category based on the classification scores;
- selecting one or more tasks to be performed by the agent in the environment based on the task selection policy of the corresponding agent category; and
- transmitting, to the agent, data defining the selected tasks to be performed by the agent in the environment.

* * * * *